UNITED STATES PATENT OFFICE.

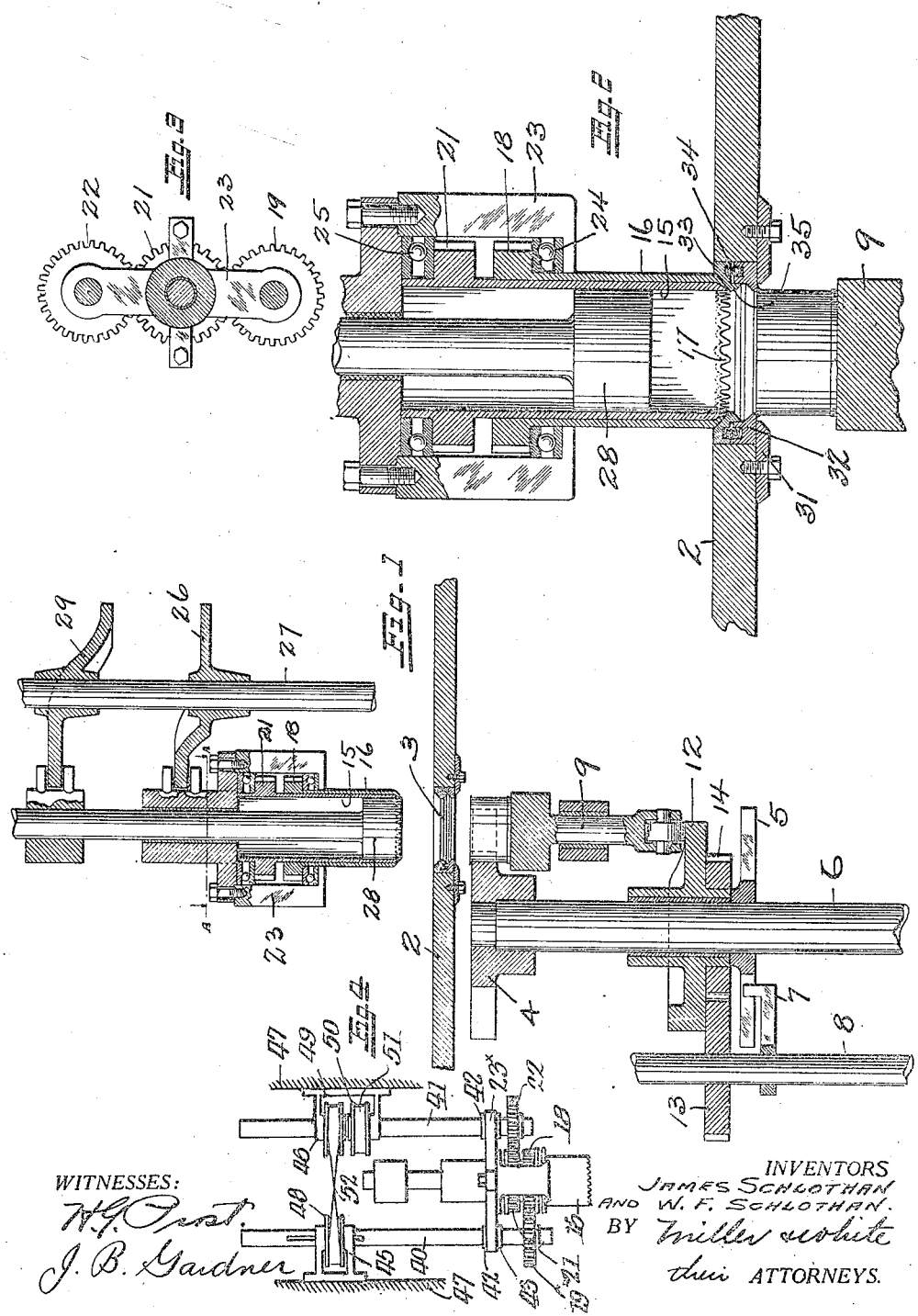

JAMES SCHLOTHAN, OF SAN FRANCISCO, CALIFORNIA, AND WILLIAM F. SCHLOTHAN, OF KETCHIKAN, TERRITORY OF ALASKA.

CUTTING MEANS FOR CANNING APPARATUS.

1,125,737.  Specification of Letters Patent.  Patented Jan. 19, 1915.

Application filed December 12, 1913.   Serial No. 806,455.

*To all whom it may concern:*

Be it known that we, JAMES SCHLOTHAN and WILLIAM F. SCHLOTHAN, citizens of the United States, and residents, respectively, of the city and county of San Francisco, State of California, and the city of Ketchikan, Territory of Alaska, have invented certain new and useful Improvements in Cutting Means for Canning Apparatus, of which the following is a specification.

The invention relates to canning apparatus and particularly to an apparatus for cutting and inserting into the can food products, such as fish.

The object of the invention is to provide an improved cutter for cutting the food product into cylinders, preparatory to inserting it into the can.

Another object of the invention is to provide means for removing the shreds of fish meat from the cutters at each cutting operation.

The invention possesses other advantageous features which, with the foregoing, will be set forth at length in the following description, where we shall outline in full that form of our invention which we have selected for illustration in the drawings accompanying and forming part of the present specification. The novelty of the invention will be included in the claims succeeding said description. From this it will be apparent that we do not limit ourselves to the showing made by said drawings and description as we may adopt many variations within the scope of our invention as set forth in said claims.

Referring to said drawings: Figure 1 is a sectional elevation of a portion of a canning machine including the devices of our invention. Fig. 2 is a vertical section of a fragment of the machine on a larger scale. Fig. 3 is a section taken on the line A—A Fig. 1. Fig. 4 is an elevation of the knife alining and driving means.

The general construction of the machine, such as the frame and driving means, are well known to persons familiar with the art and will not be described or illustrated herein. The function of the machine is to cut the food product into the desired shape and insert it into the can, and machines of this general character are employed in the salmon canning industry for cutting the fish meat into cylindrical shapes, corresponding in size to the size of the can. The fish are cleaned and boned and formed into cake, either cooked or raw, and the portions to be inserted into the separate cans are cut from the cake.

The cake is fed along a table 2 above which is arranged the cutting apparatus and below which are arranged the cans and the can feeding apparatus. The table is provided with an aperture 3 alined with the cutter and the can, through which the cut portion of fish meat passes into the can Arranged below the table 2 is a turret 4 which is given a step by step movement by any suitable means, such as the spider 5 secured to the turret shaft 6 and the revolving arm 7, fixed to the shaft 8, which is rotated at the proper speed by any suitable mechanism. The turret 4 conveys the empty cans into alinement with the aperture 3 and they are then moved into contact with the lower surface of the table 2 by the plunger 9, which is vertically reciprocated by some suitable means, such as the cam 12, loosely mounted on the shaft 6. The cam is rotated by shaft 8 through the gears 13 and 14, the gear 14 being attached to the cam. After the can has been filled, the plunger 9 moves downwardly, the can is again seated in the turret, which revolves and removes the filled can and places another empty one in position.

Arranged above and alined with the aperture 3 is the cutter. The cutter consists of two cylindrical knives 15 and 16 arranged concentrically and contiguous. The lower or cutting edges of the knives lie in the same plane and are provided with sharpened teeth 17. The lower edge of the inner knife 15 is beveled or chamfered on its outer surface and the lower edge of the outer knife 16 is beveled or inclined, so that the inner surface thereof contacts with the bevel on the outer surface of the inner knife. The outer surface of the inclined portion of the outer knife is beveled at a greater angle than the inner surface in order to produce a sharp cutting edge. By this arrangement the outer knife 16 cannot move vertically upward with respect to the inner knife and the inner knife cannot move vertically downward with respect to the outer knife. The movement in the opposite vertical direction of the knives is prevented by their mounting, thereby causing the ends to be always in contact.

Means are provided for rotating the knives in opposite directions, so that the teeth thereon shear the fish meat as the knives pass therethrough, and produce a clean cut. Secured to or formed integral with the blade 16 is a gear 18 which is engaged by gear 19 and secured to or formed integral with knife 15 is a gear 21 which is engaged by gear 22. The knives 15 and 16 and the shafts carrying gears 19 and 22 are mounted in a suitable frame 23 which is provided with suitable anti-friction bearings 24 and 25 for the knives. The frame has a cross arm 23ˣ through which extend shafts 40 and 41, said shafts being journaled in said arm. Upon the lower ends of said shafts are secured the gears 19 and 22 respectively. Collars 42 and 43 are secured on said shafts which engage the upper and lower sides of the arm 23ˣ to cause the shafts to move up and down with the frame 23 so as to maintain the gears 19 and 22 in alinement with the gears 18 and 21 respectively. The shafts 40 and 41 are respectively slidably journaled in bearings 45 and 46 which bearings are secured to fixed supports 47. A pulley 48 is slidably mounted on shaft 40 between the end members of bearing 45 and pulleys 49 and 50 are slidably mounted on shaft 41 between the end members of the bearing 46 so that said pulleys do not move longitudinally with said shafts. The pulleys are feathered to said shafts so that they rotate therewith. Power is applied to pulley 50 by belt 51 to drive the shafts 41 and a belt 52 extends over the pulleys 48 and 49 whereby the shaft 40 is driven from shaft 41. The belt 52 is crossed so as to drive the shaft 40 in a direction opposite to the direction which the shaft 41 is driven and to rotate the knives 15 and 16 in opposite directions through the medium of gears 19, 18, 22 and 21. The shafts 41 and 40 and bearings 45 and 46 maintain the frame 23 in its proper position so that the knives 15 and 16 aline with the aperture 3.

The bearing 24 is arranged below the gear 18 and the bearing 25 is arranged above gear 21, thereby holding the cutting edges of the knives in contact so that a clean cutting of the fish meat is assured. The frame 23 in which the knives are mounted is movable vertically by any suitable mechanism such as the cam 26 secured to shaft 27. Arranged within the knives is a plunger 28 which is depressed after the cutting operation is completed, forcing the fish meat from the cutter into the can. The plunger is reciprocated at the proper times by any suitable mechanism, such as the cam 29 secured to shaft 27.

Arranged in the aperture 3 in the table 2 are means for removing from the knives any scraps of fish meat which may adhere to the cutting edges thereof. Secured to the under side of the table 2 is an annular ring 31 which partly underlies the aperture 3. Arranged in the aperture and resting on the ring 31 is an annular ring 32 having its inner surface sloping inwardly toward the bottom. Arranged in the aperture above the ring 32 is an annular ring 33 having a depending portion 35 engaging the upper portion of the inner surface of the ring 32. The upper portion of the ring 33 is beveled on the same angle as the outer surface of the cutting end of the outer knife 16 and the diameters of the two beveled surfaces are equal, so that when the cutter is depressed, the outer surface thereof contacts with the beveled portion of ring 33, thereby cleaning the knives. Arranged between the rings 32 and 33 are a plurality of springs 34, so that the ring 33 is yieldingly mounted and is capable of a limited vertical movement under pressure, whereby contact between the knives and the ring 33 is assured without necessitating too close an adjustment.

In operation the fish meat is fed over the table 2 and across the aperture 3, the can is raised to position below the aperture and the cutter descends, shearing a cylinder of fish meat from the mass, the plunger then descends and forces the cylindrical portion into the can. The can then descends and is removed, and the cutter and plunger are raised to allow the fish meat on the table to be moved to present another portion over the aperture, when the operation is repeated.

We claim:

1. In a machine of the character described, a cutter comprising a pair of concentric toothed knives arranged to be rotated in opposite directions.

2. In a machine of the character described, a cutter comprising a pair of concentric and contiguous toothed knives, means for reciprocating said knives vertically, and means for rotating said knives in opposite directions.

3. In a machine, of the character described, a cutter comprising a pair of concentric and contiguous toothed knives, the outer surface of the inner knife being beveled and the inner surface of the outer knife being inclined on the angle of said bevel and contacting with said beveled portion, and means for rotating said knives in opposite directions.

4. In a machine of the character described, a cutter comprising a pair of concentric and contiguous toothed knives, the cutting edge of the inner knife being beveled on its outer surface and the cutting edge of the outer knife being inclined and tapered inwardly so that the cutting edges lie contiguous, means for rotating the knives in opposite directions, and means for reciprocating the knives vertically.

5. In a machine of the character described, a frame adapted to be reciprocated vertically, a pair of concentric cylindrical knives rotatably mounted in said frame, a gear secured to each of said knives, means for preventing the upward movement of the inner knife with respect to the frame, and means for preventing the downward movement of the outer knife with respect to said frame, the outer surface of the cutting edge of the inner knife being beveled inwardly, and the inner surface of the cutting edge of the outer knife being inclined inwardly at the same angle as said bevel, and means engaging said gears arranged to rotate them in opposite directions.

6. In a machine of the character described, a table having an aperture therein, an annular ring having an inwardly beveled upper surface yieldingly mounted in said aperture, a rotating cutter having its cutting edge beveled at the same angle as said ring arranged above and alined with said aperture, and means for moving said cutter vertically.

7. In a machine of the character described, a table having an aperture therein, an annular ring yieldingly arranged in said aperture, a rotating cutter arranged above and alined with said ring, and means for moving said cutter vertically to move its cutting edge into contact with said ring.

8. In a machine of the character described, a table having an aperture therein, an annular ring arranged in said aperture, a second annular ring arranged above said first named ring, springs arranged between said rings, the upper ring being provided with a depending portion overlying the joint between said rings and having its upper surface beveled inwardly, a cutter having a cutting edge beveled at the same angle as said beveled portion and of the same diameter as said beveled portion, arranged above and alined with said aperture, means for rotating said cutter, and means for moving said cutter vertically with respect to said table.

JAMES SCHLOTHAN.
WILLIAM F. SCHLOTHAN.

Witnesses to the signature of James Schlothan:
 H. G. Prost,
 M. Le Conte.

Witnesses to the signature of William F. Schlothan:
 Frank H. Bold,
 Fremont King.